United States Patent
Shenfield et al.

(10) Patent No.: US 7,929,523 B2
(45) Date of Patent: Apr. 19, 2011

(54) SYSTEM AND METHOD FOR COMMUNICATING ASYNCHRONOUSLY WITH SYNCHRONOUS WEB SERVICES USING A MEDIATOR SERVICE

(75) Inventors: Michael Shenfield, Richmond Hill (CA); Bryan R. Goring, Milton (CA); Igor Tsenter, Woodbridge (CA)

(73) Assignee: Research In Motion Limited, Waterloo (CA)

( * ) Notice: Subject to any disclaimer, the term of this patent is extended or adjusted under 35 U.S.C. 154(b) by 576 days.

(21) Appl. No.: 11/255,873

(22) Filed: Oct. 24, 2005

(65) Prior Publication Data

US 2006/0039401 A1    Feb. 23, 2006

Related U.S. Application Data

(63) Continuation of application No. 11/065,055, filed on Feb. 25, 2005, now abandoned.

(60) Provisional application No. 60/548,096, filed on Feb. 27, 2004.

(51) Int. Cl.
*H04L 12/28* (2006.01)
*H04J 3/06* (2006.01)
*G06F 15/167* (2006.01)
*G06F 15/16* (2006.01)

(52) U.S. Cl. .................. 370/389; 370/392; 370/395.62; 370/503; 370/509; 709/215; 709/217

(58) Field of Classification Search ........... 709/212–219
See application file for complete search history.

(56) References Cited

U.S. PATENT DOCUMENTS 6,035,324 A    3/2000  Chang et al.

(Continued)

FOREIGN PATENT DOCUMENTS

GB    2313524    11/1997

(Continued)

OTHER PUBLICATIONS

Chang, H et al., "Web Browsing in a Wireless Environment: Disconnected and Asynchronous Operation in ARTour Web Express", Proceedings of the Third Annual ACM/IEEE International Conference on Mobile Computing and Networking, MOBICOM 97, p. 260-269, Sep. 26-30, 1997, Bidapest, Hungary.

(Continued)

*Primary Examiner* — Huy D Vu
*Assistant Examiner* — Brandon Renner

(57) ABSTRACT

A system, method and computer readable medium for mediating communication between a mobile device and a data source over a network is described. The system includes an asynchronous message receiver that is configured to receive an asynchronous request message from the device. The asynchronous request message includes an identifier field for identifying the asynchronous request message and a message field. The system also includes a synchronous message transceiver communicatively coupled to the asynchronous message receiver and configured to synchronously communicate with the data source by sending a synchronous request message to the data source and receiving a synchronous response message from the data source in return. The synchronous request message includes the message field of the asynchronous request message. A rules processor also forms part of the system, and is communicatively coupled to the synchronous message transceiver. The rules processor is configured to apply a set of rules to combine the identifier field and the message field of the asynchronous request message with a message field of the synchronous response message to form an asynchronous response message that is correlated with the asynchronous request message, thereby allowing the device to use application logic resident thereon to resolve the relation between the asynchronous request and response messages by using the identifier field, and to process the asynchronous response message without having to store the message field of the asynchronous request message on the device after the asynchronous request message has been asynchronously pushed from the device.

15 Claims, 10 Drawing Sheets

U.S. PATENT DOCUMENTS

| | | | |
|---|---|---|---|
| 6,336,135 B1 | 1/2002 | Niblett et al. | |
| 6,584,321 B1* | 6/2003 | Coan et al. | 455/466 |
| 6,591,310 B1 | 7/2003 | Johnson | |
| 6,721,288 B1 | 4/2004 | King et al. | |
| 7,363,342 B1* | 4/2008 | Wang et al. | 709/204 |
| 2002/0013842 A1* | 1/2002 | Schweitzer et al. | 709/224 |
| 2002/0023127 A1 | 2/2002 | Sabeti | |
| 2002/0064167 A1* | 5/2002 | Khan et al. | 370/410 |
| 2002/0087507 A1 | 7/2002 | Hopewell et al. | |
| 2002/0091811 A1* | 7/2002 | Schweitzer et al. | 709/223 |
| 2003/0065709 A1 | 4/2003 | Jordan et al. | |
| 2003/0065738 A1* | 4/2003 | Yang et al. | 709/215 |
| 2003/0187938 A1* | 10/2003 | Mousseau et al. | 709/206 |
| 2003/0206192 A1 | 11/2003 | Chen et al. | |
| 2004/0039460 A1 | 2/2004 | Kaputin | |
| 2004/0163088 A1* | 8/2004 | Frender et al. | 719/313 |
| 2004/0249950 A1 | 12/2004 | Christensen et al. | |
| 2004/0255046 A1 | 12/2004 | Ringseth et al. | |
| 2005/0021663 A1* | 1/2005 | Knauerhase et al. | 709/217 |

FOREIGN PATENT DOCUMENTS

| | | |
|---|---|---|
| GB | 2381409 | 4/2003 |
| WO | WO99/01960 | 1/1999 |
| WO | WO 03/077139 | 9/2003 |
| WO | WO 2004/066081 | 8/2004 |

OTHER PUBLICATIONS

Floyd, R. and Housel, B., "Mobile Web Access Using eNetwork Web Express", IEEE Personal Communications, IEEE, vol. 5, Issue 5, p. 47-52, Oct. 1998.

"Notification of Transmittal of the International Search Report and the Written Opinion of the International Searching Authority, or the Declaration" for International Application No. PCT/CA2005/000287, May 16, 2005, 14 pages, International Searching Authority.

"Notification of Transmittal of International Preliminary Report on Patentability" for International Application No. PCT/CA2005/000287, Mar. 22, 2006, 8 pages, International Preliminary Examining Authority.

Decision to grant a European patent pursuant to Article 97(1) EPC for EP 1719288, Apr. 3, 2008, European Patent Office.

European Examination Report for EP 1719288 (Application No. 05714528.6-2416), 3 pages, Jun. 5, 2007, European Patent Office.

Supplementary European Search Report for EP 1719288 (Application No. 05714528.6-2416), 3 pages, Apr. 10, 2007, European Patent Office.

Decision to grant European patent pursuant to Article 97(1) EPC for EP 1735947, May 23, 2008, European Patent Office.

European Examination Report for EP 1735947 (Application No. 05714529.4-2416), 9 pages, Jun. 18, 2007, European Patent Office.

Supplementary European Search Report for EP 1735947 (Application No. 05714529.4-2416), 3 pages, Apr. 10, 2007, European Patent Office.

Office Action for corresponding U.S. Appl. No. 11/065,030 mailed Mar. 24, 2008, United States Patent Office.

Office Action for corresponding U.S. Appl. No. 11/065,030 mailed Dec. 10, 2008, United States Patent Office.

Office Action for corresponding U.S. Appl. No. 11/065,030 mailed May 11, 2009, United States Patent Office.

Office Action for corresponding U.S. Appl. No. 11/065,030 mailed Nov. 24, 2009, United States Patent Office.

Office Action for U.S. Appl. No. 11/065,030 mailed Jun. 8, 2010, United States Patent Office.

Office Action for corresponding Canadian Application No. 2,557,145 mailed Jul. 29, 2009, Canadian Intellectual Property Office.

Notice of Allowance and Fee(s) Due issued for corresponding U.S. Appl. No. 11/065,030, mailed Oct. 18, 2010, United States Patent Office.

* cited by examiner

SYSTEM AND METHOD FOR COMMUNICATING ASYNCHRONOUSLY WITH SYNCHRONOUS WEB SERVICES USING A MEDIATOR SERVICE

This is a continuation which claims priority from U.S. patent application Ser. No. 11/065,055 filed Feb. 25, 2005 now abandoned, herein incorporated by reference, which claims priority from U.S. Provisional Application No. 60/548,096, filed Feb. 27, 2004, herein incorporated by reference.

BACKGROUND

This application relates generally to wireless communication and specifically to network messaging for mobile communication devices.

There is a continually increasing number of mobile communication devices in use today, such as mobile telephones, PDAs with wireless communication capabilities, and two-way pagers. Software applications which run on these mobile communication devices increase their utility. For example, a mobile phone may include an application which retrieves the weather for a range of cities, or a PDA may include an application that allows a user to shop for groceries. These software applications take advantage of the mobility of these devices and connectivity to a wireless network in order to provide timely and useful services to users, regardless of where the users are. However, due to the restricted resources of mobile communications devices, and the complexity of delivering data wirelessly to a mobile communication device, developing software applications for mobile communications devices remains a difficult and time-consuming task.

Web Services are emerging as the de-facto mechanism to allow disjoint parties to collaborate on the Internet. Web services allow businesses and other parties to collaborate in a universal, platform and language neutral way and promise to overcome traditional barriers encountered in linking numerous and diverse information systems. Web services are still in their relative infancy, with many technology players cooperating to define the emerging standards, and corporations beginning to throw their weight behind the thirst to link disparate systems over the web using this standard approach. A common model employed in web service offerings is the traditional synchronous request-response type interaction whereby the consumer of the service passes some information and receives something in response. In this scenario the user of the device requests or "pulls" the content from the network. In other words, the content is constantly present in the network, but the user needs to issue a retrieval request to access the information (e.g. using a browser on the mobile device).

In real-life applications there is a lot of information that is available to a user but hardly accessible, as the user doesn't know when the information is posted or when there is a change in the status of the posted content. Such information ideally needs to be "pushed" to the user either periodically or when certain predefined events occur. Some examples of possible push situations are unrequested arrival of new e-mail, stock market information, multi-user game updates, etc. This ability to push information spontaneously implies an asynchronous messaging framework. From a practical point of view, wireless communications have higher cost than wired communications and usually are characterized by higher latency times, making a "pull" from a wireless device inherently expensive. Slow connection times sometimes might be critical to the user's experience. Push technology can be wireless friendly. Its users can benefit in a number of ways: push technology can make useful data instantly available; can improve user perception of the wireless network; can make data delivery cost effective (since the device does not have to repeatedly poll for data); and can extend battery life.

Wireless push would involve a server that, given a user's specific one-time request to be notified with specific data on predefined conditions, would send this data to the user's device as soon as the data is available and/or the conditions have been met. The communication protocol and user/device addressing are device-specific and the server must be aware of them. Web Services have become a ubiquitous standard for access to content resources as well as communicating to back-end servers. Their number and complexity have increased considerably in recent years. However, invoking Web Service operations from a wireless device using the synchronous communication method exclusively can be expensive and impractical.

SUMMARY OF THE INVENTION

Systems and methods disclosed herein provide a mediating service environment to obviate or mitigate at least some of the above presented disadvantages.

Wireless push would involve a server that, given a user's specific one-time request to be notified with specific data on predefined conditions, would send this data to the user's device as soon as the data is available and/or the conditions have been met. The communication protocol and user/device addressing are device-specific and the server must be aware of them. Web Services have become a ubiquitous standard for access to content resources as well as communicating to back-end servers. Their number and complexity have increased considerably in recent years. However, invoking Web Service operations from a wireless device using the synchronous communication method exclusively can be expensive and impractical. Contrary to current systems and methods there is provided a system and method for mediating communication between a mobile device and a data source over a network.

The system includes an asynchronous message receiver configured to receive an asynchronous request message from the device, the asynchronous request message including an identifier field for identifying the asynchronous request message and a message field; a synchronous message transceiver communicatively coupled to the asynchronous message receiver and configured to synchronously communicate with the data source by sending a synchronous request message to the data source and receiving a synchronous response message from the data source in return, the synchronous request message including the message field of the asynchronous request message; and a rules processor communicatively coupled to the synchronous message transceiver and configured to apply a set of rules to combine the identifier field and the message field of the asynchronous request message with a message field of the synchronous response message to form an asynchronous response message that is correlated with the asynchronous request message, thereby allowing the device to use application logic resident thereon to resolve the relation between the asynchronous request and response messages by using the identifier field, and to process the asynchronous response message without having to store the message field of the asynchronous request message on the device after the asynchronous request message has been asynchronously pushed from the device.

There is further provided a rules store communicatively coupled to the rules processor and configured to store the set of rules accessible by the rules processor.

There is further provided a method for mediating communication between a mobile device and a data source over a network, the method including receiving an asynchronous request message from the device over the network, the asynchronous request message including an identifier field for identifying the asynchronous request message and a message field; transmitting a synchronous request message to the data source and receiving a synchronous response message from the data source in return, the synchronous request message including the message field of the asynchronous request message; and applying a set of rules to combine the identifier field and the message field of the asynchronous request message with a message field of the synchronous response message to form an asynchronous response message that is correlated with the asynchronous request message, thereby allowing the device to use application logic resident thereon to resolve the relation between the asynchronous request and response messages by using the identifier field, and to process the asynchronous response message without having to store the message field of the asynchronous request message on the device after the asynchronous request message has been asynchronously pushed from the device.

There is further provided a computer readable medium storing a computer program for mediating communication between a mobile device and a data source over a network, the computer readable medium comprising an asynchronous message receiver module stored on the medium and configured to enable an asynchronous message receiver to receive an asynchronous request message from the device, the asynchronous request message including an identifier field for identifying the asynchronous request message; a synchronous message transceiver module stored on the medium, configured to enable a synchronous message transceiver to communicate with the asynchronous message receiver and configured to enable the synchronous message transceiver to synchronously communicate with the data source by sending a synchronous request message to the data source and receiving a synchronous response message from the data source in return, the synchronous request message including a message field of the asynchronous request message; and a rules processor module stored on the medium, configured to enable a rules processor to communicate with the synchronous message transceiver module and to apply a set of rules to combine the identifier field and the message field of the asynchronous request message with a message field of the synchronous response message to form an asynchronous response message that is correlated with the asynchronous request message, thereby allowing the device to use application logic resident thereon to resolve the relation between the asynchronous request and response messages by using the identifier field, and to process the asynchronous response message without having to store the message field of the asynchronous request message on the device after the asynchronous request message has been asynchronously pushed from the device.

BRIEF DESCRIPTION OF THE DRAWINGS

These and other features will become more apparent of embodiments of the present invention in the following detailed description, in which reference is made to the appended drawings by way of example wherein.

DESCRIPTION

Network System

Figure 1:
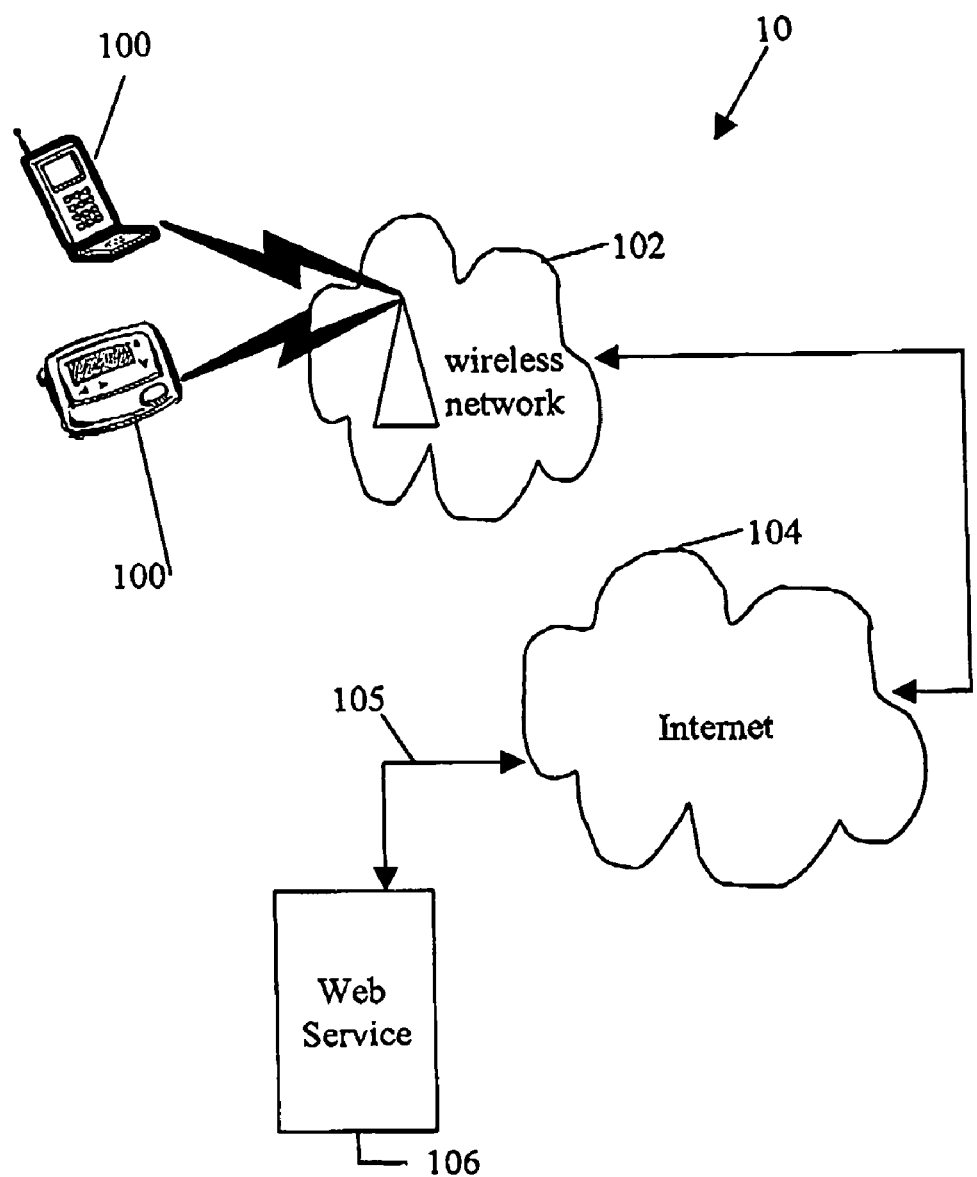
FIG. 1 is a block diagram of a communication system.

Referring to FIG. 1, a network system 10 comprises mobile communication devices 100 for interacting with one or more web services 106 provided via a coupled wireless network 102 and the Internet 104. The devices 100 transmit and receive requests/response messages 105, respectively, when in communication with the web services 106. The devices 100 can operate as web clients of the web services 106 by using the requests/response messages 105 in the form of message header information and associated data content, for example requesting and receiving product pricing and availability from an on-line merchant. The web service 106 is an example of a system with which client application programs 302 (see FIG. 2) on the communication devices 100 interact via the wireless network 102 and the Internet 104 in order to provide utility to users of the communication devices 100. The messages 105 sent between the communication devices 100 and the web service 106 could traverse a message-map service (not shown) which converts the messages 105 between the differing formats used by the devices 100 and the web service 106.

For satisfying the appropriate request/response messages 105, the web service 106 could communicate with the devices 100 through various protocols (such as but not limited to HTTP and component API) for exposing relevant business logic (methods) to client application programs 302 (see FIG. 2) once provisioned on the devices 100. The application programs 302 of the devices 100 can use the business logic of the web service 106 similarly to calling a method on an object (or a function). It is recognized that the client application program 302 can be downloaded/uploaded in relation to the web service 106, through the messages 105 via the network 102, 104, directly to the devices 100. It is further recognized that the devices 100 can communicate with one or more web services 106 via the networks 102, 104.

Server Environment

Referring to FIG. 1, the web service 106 provides information messages 105 which are used by the client application programs 302 on the communication devices 100. Alternatively, or in addition, the web service 106 may receive and use the information messages 105 provided by the client application programs 302 executed on the communication devices 100, or perform tasks on behalf of client application programs 302 executed on the communication devices 100. The web service 106 can be defined as a software service, which can implement an interface expressed using Web Services Description Language (WSDL) registered in Universal Discovery Description and Integration (UDDI), for example, and can communicate through messages 105 with client devices 100 by being exposed over the Internet 104 through an appropriate protocol such as the Simple Object Access Protocol (SOAP), for example. In some implementations, SOAP is a specification that defines the XML format for the messages 105, including a well-formed XML fragment enclosed in SOAP elements. Other parts of SOAP specify how to represent program data as XML and how to use SOAP to do Remote Procedure Calls (RPC). These optional parts of SOAP are used to implement RPC-style applications where a SOAP request message 105 containing a callable function, and the parameters to pass to the function, is sent from the client device 100, and the service 106 returns the response message 105 with the results of the executed function. SOAP also supports document style applications where the SOAP message 105 is a wrapper around an XML document. A further optional part of SOAP defines the HTTP binding (e.g. header), whereas some SOAP implementations support MSMQ, MQ Series, SMTP, or TCP/IP transport protocols. Alternatively, the web service 106 may use other known communication protocols, message 105 formats, and the interface may be expressed in other web services 106 languages than described above. Accordingly, the services supplied by the web service 106 are utilized by the user of the devices 100 over the network 102, 104.

Client Environment

Figure 2:
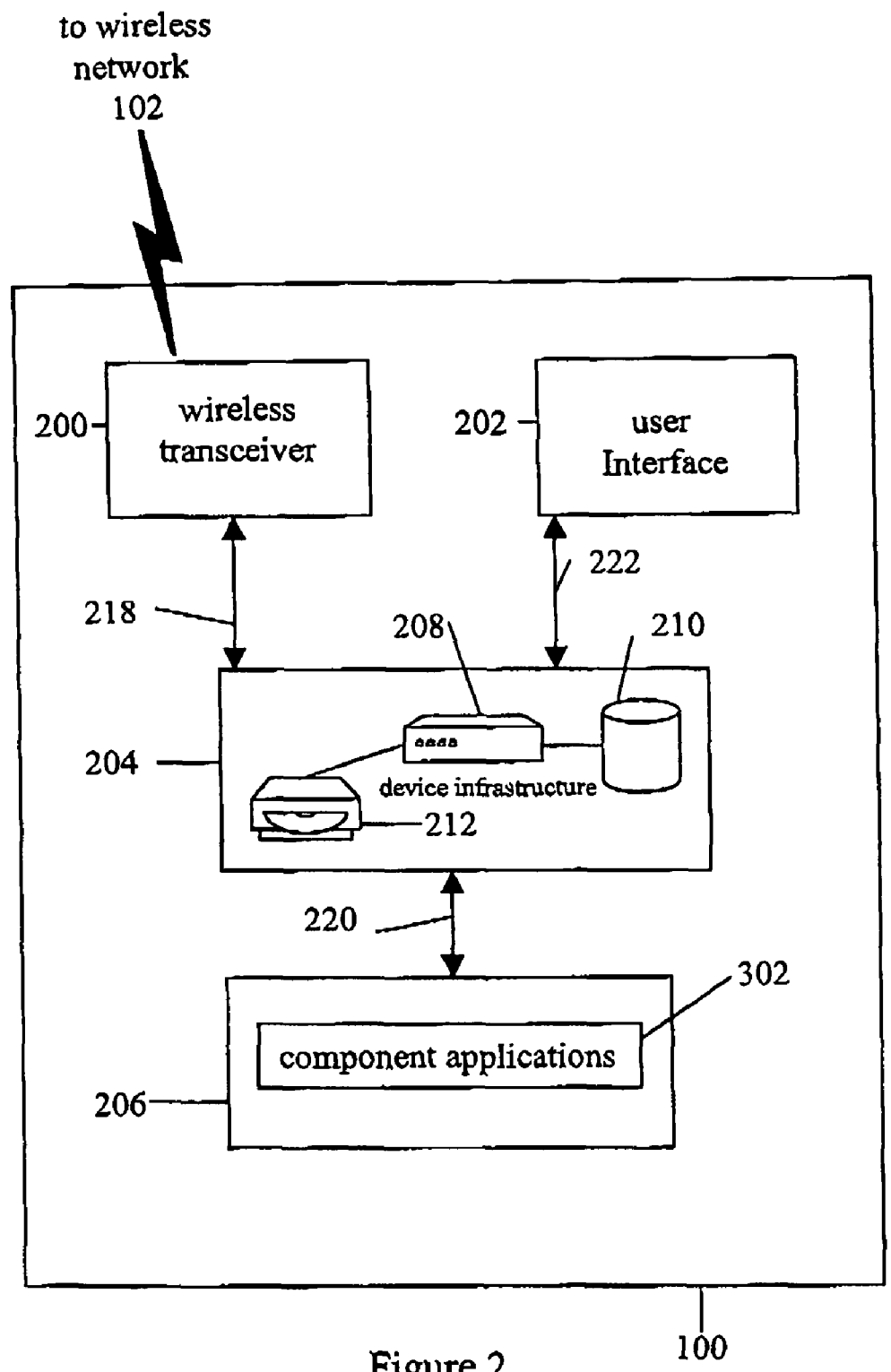
FIG. 2 is a block diagram of a mobile communication device of FIG. 1.
Figure 3:
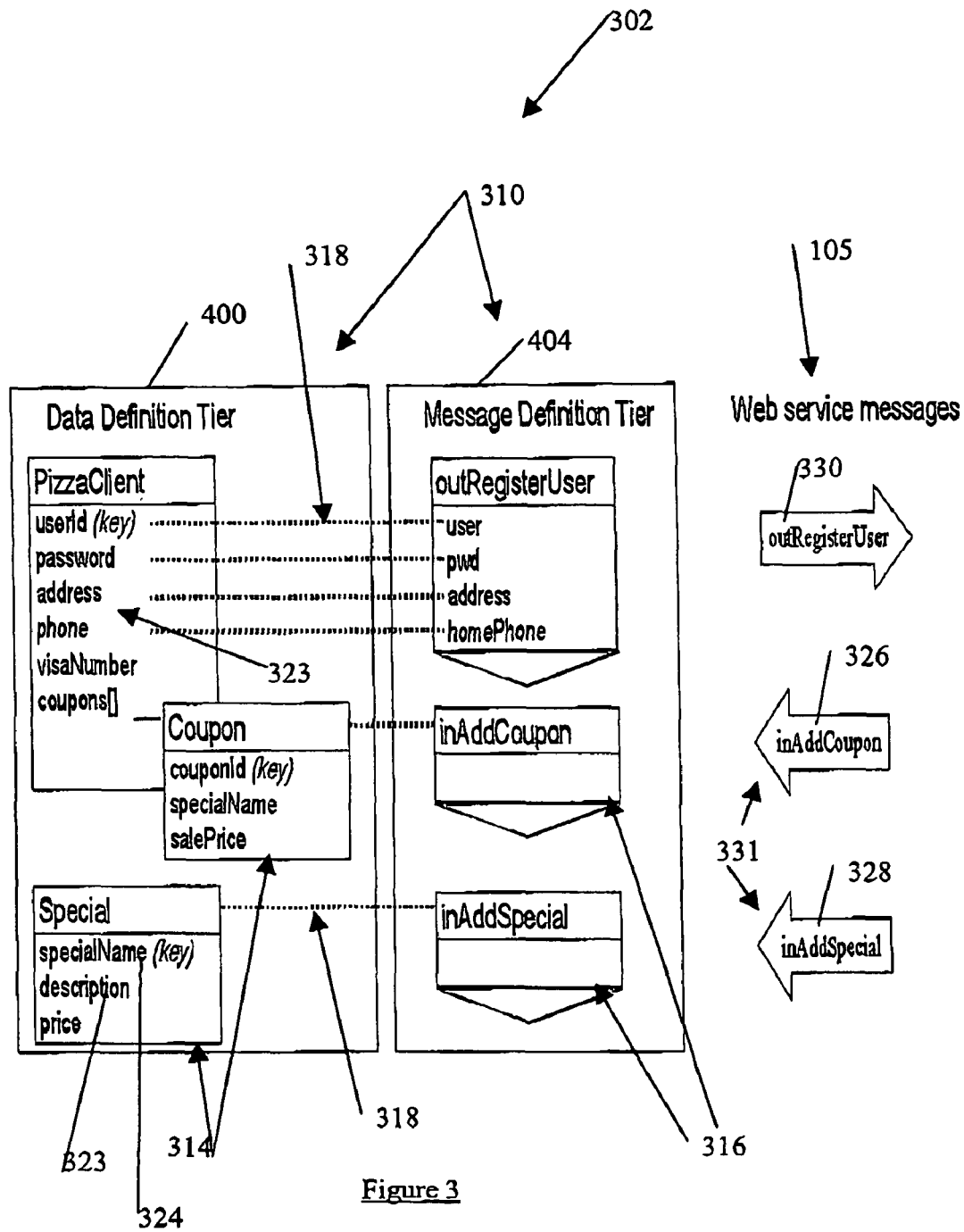
FIG. 3 is an asynchronous messaging and data relationship example of the web service of FIG. 1.

Referring to FIGS. 2 and 3, the applications 302 are software applications which can be written, for example, in extensible Markup Language XML) and a subset of ECMAScript. An example application 302 is described in detail, for completeness purposes, with reference to FIG. 10 in the Application Program 302 section found at the end of this Description Section. XML and ECMAScript are standards-based languages which allow software developers to develop the applications 302 in a portable and platform-independent way. The applications 302 can be transmitted over-the-air via the wireless network 102 and loaded into a memory module 210 of a device infrastructure 204. Alternatively, the applications 302 may be loaded via a serial connection, a USB connection, or a short-range wireless communication system such as IR, 802.11(x) and/or Bluetooth™ onto the device 100. Once loaded onto the mobile communication device 100, the applications 302 are executed by a framework 206 on the mobile communication device 100, which converts applications 302 into native code which is executed by the processor in the device infrastructure 204. Alternatively, the applications 302 may be executed as native code or interpreted by another software module or operating system on the mobile communication device 100, which provides the framework 206 as a native runtime environment, hereafter referred to generically by reference numeral 206.

Referring again to FIG. 3, the applications 302 are organised as multiple tier/layer 310 applications 302, such as but not limited to a messaging layer 404 and a data layer 400. It is recognised that the application 302 can contain other layers 310, such as but not limited to a presentation layer 402 and a workflow layer 406, as further explained below with reference to FIG. 10. The application 302 is configured to have a set of data definitions 314 in the data layer 400, a set of asynchronous message definitions 316 in the message layer 404 and mappings 318 that specify how the message definitions 316 are related to the underlying data definitions 314. In general, it is recognised that the application definitions 314, 316 (including definitions 320,322—see FIG. 10) of the respective layers 310 can be expressed in a structured definition language such as but not limited to XML.

Data Components 400 can be defined as application 302 data represented in native code or XML, or other structured definition languages. Message Components 402 can be defined as messaging data represented in native code or XML, or other structured definition languages. Message components 402 may define mapping relationships to Data Components 400 that specify their definition, or how underlying data is affected through transmission or reception of the messages 330,331a,331b. The Device Runtime or framework 206 can be defined as the software that hosts and evaluates the application 302. The Device Runtime 206 provides services to manage data associated to the application 302, provides capability for asynchronous incoming 331b and outgoing messages 330 generated by the application 302, and manages relationships between messages and data. Message Mapping can be defined as a relationship existing between data 400 and message 402 components that specifies partial or complete definition of the message based on a data mapping, and how messaging interactions affect the underlying data.

Generally the data definitions 314 are distinguished as having a set of sub-elements 323 (or fields), and define a key field or identifier 324 by which the mapping 318 (from the corresponding message definition 316) to the associated data element 323 may be resolved. Messages 105 derived from the message definitions 316 can define a set of fields but may not specify key fields, which is implemented through mappings 318. The messages 105 are typically short lived; are consumed and then discarded, whereas data elements 323 corresponding to the data definitions 314 are long lived and may be restored at any time from the persistent storage 210 (see FIG. 2) by providing the appropriate key field value 324 by the storage service (not shown) of the device runtime 206. The messages 105, either synchronous-based or asynchronous-based, represent interactions with entities (i.e. web-services 106) outside of the Device Runtime 206 and these messages 105 are typically not correlated by the web services 106 themselves. The messages 105 may be defined as originating (i.e. out message 105) from the device runtime 206 and targeted to the external web service 106, or may be transmitted (i.e. in message 105) to the device runtime 206.

Further, message definitions 316 may define relationships to data elements 323 called mappings 318 that determine how origination or reception of the related message 105 affects the related data element 323, as for example defined by the data definition 314 of the data layer 400. This mapping 318 relation is uniquely identified by the key field 324 mapping 318 that may be determined as follows, such as but not limited to:

the mapping 318 is made directly to the data definition 314: the message 105 takes its complete definition from the data definition 314 such that the data element key field 324 value is extracted from identical message definition 316 field element (generally referred to hereafter as message mapping 318 wherein all fields of the message 105 correspond to all fields of the data definition 314); and the mapping 318 is from a field of the message definition 316 to a field of the data definition 314: the message 105 partially defines itself such that the data element key field 324 value is extracted from mapped message field (generally referred to hereafter as field mapping 318 wherein selected fields of the data definition 314 are mapped 318 to selected fields of the message definition 316).

As an example, referring to FIG. 3, consider an asynchronous web service 106 (see FIG. 1) that models a pizza parlour. This web service 106 exposes the capability to register the wireless device 100 as a PizzaClient application 302 (see FIG. 2) and may ayunchronously deliver the user an asynchronous response message 331, e.g. a Coupon message 326 or a Special message 328, to the wireless application 302 running on the runtime environment 206 of the device 100. The set of corresponding data elements 323 and asynchronous response messages 331 to interact with the web service 106 are depicted in FIG. 3, which illustrates the PizzaClient data elements 323 and message field level mappings 318 to the outRegisterUser outgoing request message 330. The Pizza-Client application 302 may contain none or more Coupon data elements 323 which are message mapped 318 directly to the inAddCoupon incoming message 326. Finally the Special data element 323 is message mapped 318 directly to the inAddSpecial incoming message 328. It is noted that the in AddCoupon 326 and inAddSpecial 328 are asynchronous messages 331, such that each arriving message 326,328 identifies its own key field (from mapping 318) that affects the underlying data element 323. For example, once the messages 326,328 are received by the application 302, the persistence service (e.g. data manager) of the device 100 may create a new data element or update an existing data element resident in the storage 210 (see FIG. 2).

Figure 4:
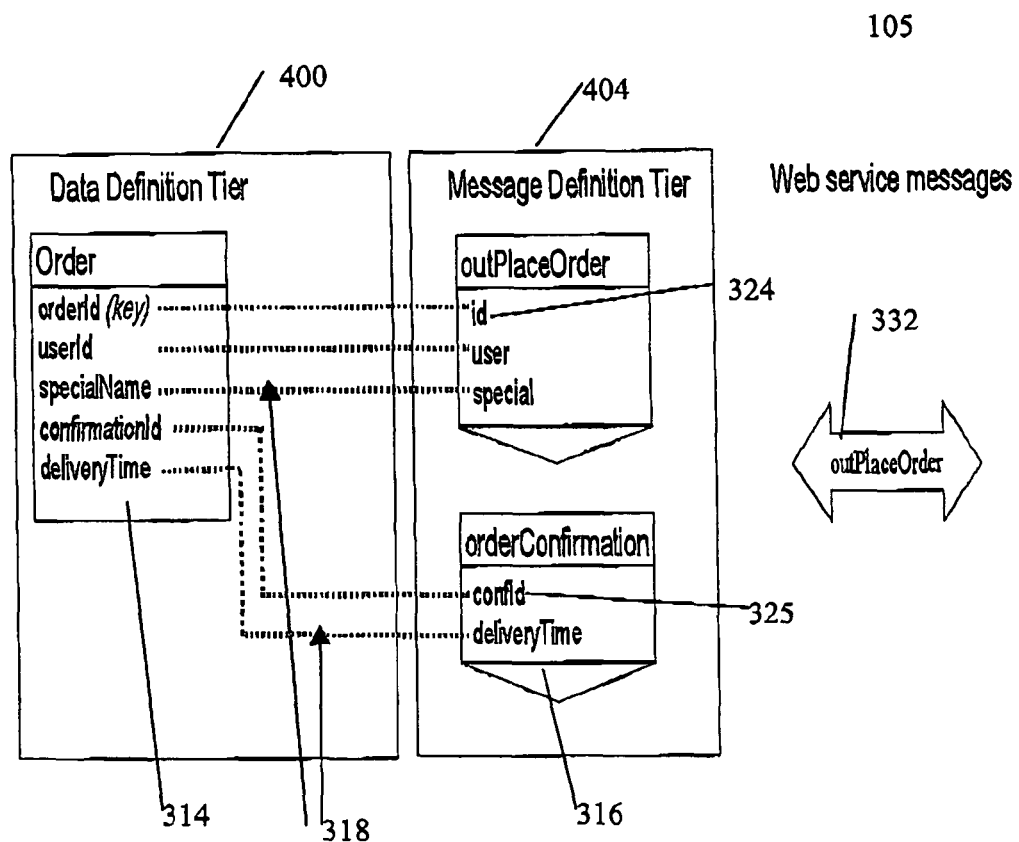
FIG. 4 is an example synchronous operation of the web service of FIG. 3.

Further, referring to FIG. 4, suppose that the Pizza Shop now wants to extend their web service 106 by allowing the user of the device 100 to order a pizza. The web service 106 can be enhanced to provide a synchronous message operation 332 that accepts some order criteria and returns order confirmation and delivery time. The order request is distinguished by an order id (this becomes the data key 324, preferably a unique identifier), and the order confirmation id 325 is associated with uncorrelated data from the web service 106 describing the success of the order. Correlation of the return data from the Web Service's 106 perspective is achieved by the synchronous request-response nature of the submission operation 332. However correlation of the returned data within the framework of the asynchronous messaging model (see FIG. 3) of the device runtime environment 206 is not immediately apparent, due to the fact that the order confirmation data returned by the web service 106 is uncorrelated to the request by any key 324 information, which if included would tie the result to the original order data element. As depicted in FIG. 4, two asynchronous message definitions 316 are used to generate corresponding messages 105 to handle the order placement (outPlaceOrder) and reception of order confirmation (orderConfirmation). The mediator 500 (see FIG. 5) is used to help link the order confirmation information directly to the originating Order data element, as further described below.

Referring again to FIGS. 1 and 2, the client runtime environment 206 provided by the devices 100 can be configured to make the devices 100 operate as web clients of the web services 106. The client runtime environment 206 of the devices 100 is preferably capable of generating, hosting and executing the client application programs 302 (which are in the form of tiered/layered 310 applications—see FIG. 3) on the device 100. Further, specific functions of the client runtime environment 206 can include such as but not limited to support for language, coordinating memory allocation, networking, management of data during I/O operations, coordinating graphics on an output device of the devices 100 and providing access to core object oriented classes and supporting files/libraries.

The terminal runtime environment 206 of the devices 100 preferably supports the following basic functions for the resident executable versions of the client application programs 302, such as but not limited to:

provide a communications capability to send the messages 105 to the Web Services 106 connected via the network 102, 104;

provide data input capabilities by the user on the input interface 202 (see FIG. 2) of the devices 100 to supply data parts for Web Services' outgoing messages 105 (messages to the service 106);

provide data presentation or output capabilities for Web Services' response messages 105 (incoming messages) or uncorrelated notifications of the web service 106 on the output interface 202;

provide data storage services to maintain local client data in the memory module 210 (see FIG. 9) of the device 100; and provide an execution environment for a scripting language for coordinating operation of the application layers 400, 402, 404, 406 (see FIG. 10) of the client application programs 302.

Therefore, the native client terminal runtime environment 206 provides an interface for the client application programs 302 and to the device 100 functionality of a processor 208 and associated operating system of a device infrastucture 204. The runtime environment 206 preferably supplies a controlled, secure and stable environment on the device 100, in which the component application programs 302 execute. The runtime environment 206 provisions the definitions of the layers 400, 402, 404, 406 to create the actual web client.

Communication Device

Figure 9:
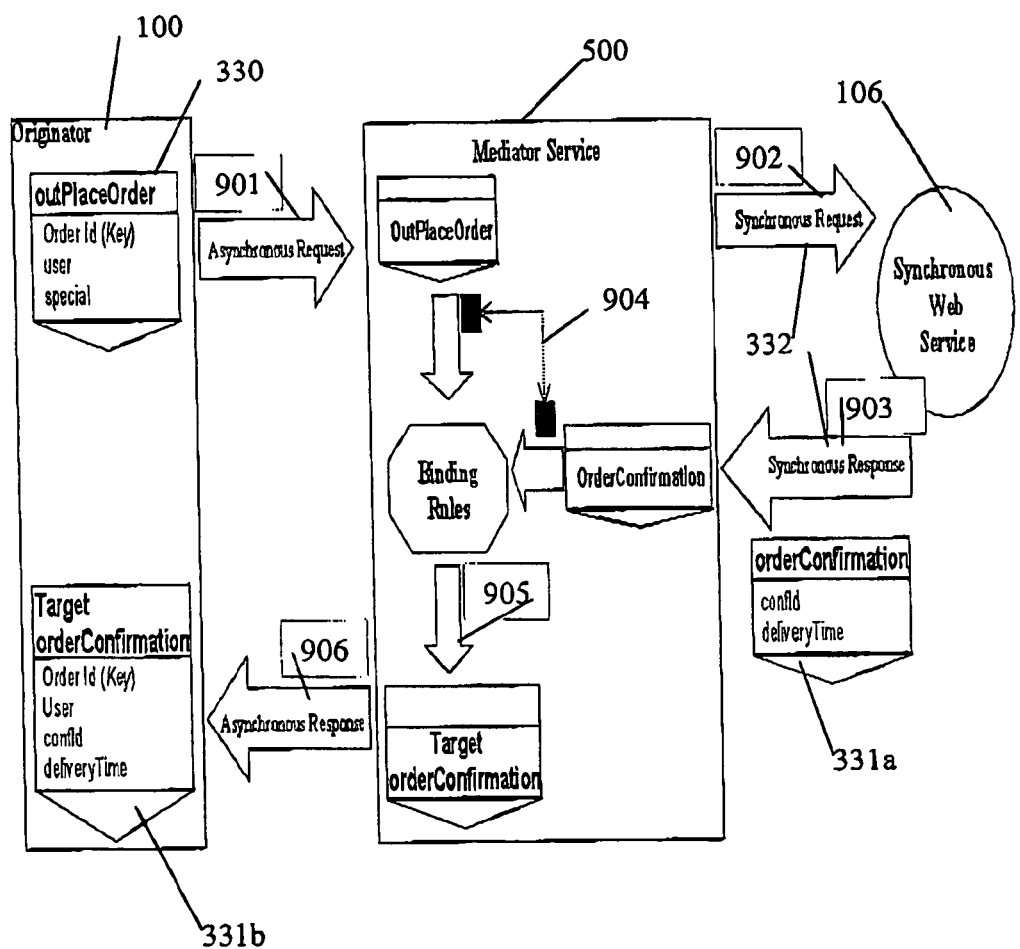
FIG. 9 is an example operation of the binding rules applied to mediator messaging of FIG. 7.

Referring to FIGS. 1 and 2, the communication devices 100 are devices such as but not limited to mobile telephones, PDAs, two-way pagers and dual-mode communication devices (see FIG. 9). The devices 100 include a network connection interface such as a wireless transceiver 200 coupled via connection 218 to the device infrastructure 204. The wireless transceiver 200 is connectable during operation of the devices 100 to the network 102, 104, such as to the wireless network 102 by RF links, which enable the devices 100 to communicate with each other and with external systems (such as the web service 106) via the network 102, 104. The wireless transceiver 200 also helps the device 100 to coordinate the request/response messages 105 between the client application programs 302 and the service 106. The network 102, 104 supports the transmission of data in the request/response messages 105 between devices 100 and external systems, which are connected to the network 102, 104. The network 102, 104 may also support voice communication for telephone calls between the communication devices 100 and devices which are external to the network 102, 104. A wireless data transmission protocol can be used by the wireless network 102, such as but not limited to DataTAC, GPRS or CDMA. The connection between the wireless network 102 and the Internet 104 includes an Internet Gateway (not shown), which provides for the messages 105 and associated data content to flow between the connected devices 100 and the web service 106.

Referring again to FIG. 2, the devices 100 also have the user interface 202, coupled to the device infrastructure 204 by connection 222, to interact with a user (not shown). The user interface 202 can include one or more user input interfaces such as but not limited to a QWERTY keyboard, a keypad, a trackwheel, a stylus, a mouse, a microphone, and the user output interface such as an LCD screen display and/or a speaker. If the screen is touch sensitive, then the display can also be used as the user input device as controlled by the device infrastructure 204. The user interface 202 is employed by the user of the device 100 to coordinate the requests/response message messages 105 over the system 10 (see FIG. 1) as employed by client application programs 302 executed in the runtime environment 206.

Referring again to FIG. 2, operation of the communication device 100 is enabled by the device infrastructure 204. The device infrastructure 204 includes the computer processor 208 and the associated memory module 210. The computer processor 208 manipulates the operation of the network interface 200, the user interface 202 and the runtime environment 206 of the communication device 100 by executing related instructions, which are provided by an operating system and client application programs 302 located in the memory module 210. Further, it is recognized that the device infrastructure 204 can include a computer readable storage medium 212 coupled to the processor 208 for providing instructions to the processor and/or to load/update client application programs 302 in the memory module 210. The computer readable medium 212 can include hardware and/or software such as, by way of example only, magnetic disks, magnetic tape, optically readable media such as CD/DVD ROMS, and memory cards. In each case, the computer readable medium 212 may take the form of a small disk, floppy diskette, cassette, hard disk drive, solid state memory card, or RAM provided in the memory module 210. It should be noted that the above listed example computer readable media 212 can be used either alone or in combination.

Mediator Service 500

The desire to migrate towards an asynchronous messaging 105 paradigm in relation to the device 100 is further explained with reference to FIG. 5. To provide the capability of interacting with synchronous web services 106 using an asynchronous messaging 331,330 scheme, the mediator service 500 operates by disconnecting the synchronous request/response messaging 331,330 with the web service 106 (through the message brokering of the mediator service 500) from the Device Runtime 206 of the device 100. The Mediator Service 500 acts as a proxy to the Originator device asynchronous messaging 330, 331b. The Mediator Service 500 interacts with the Originator device 100 using asynchronous messages 330,331b, while the mediator service 500 interacts with the web service in the synchronous fashion. In this way, the Device Runtime 206 may interact asynchronously (i.e. messaging 331,330) with the mediator service 500; the mediator service 500 in turn provides the synchronous messaging 332 with the web service 106 and delivers the asynchronous response message 331 to the device 100 when available. The problem that arises is that of correlating the asynchronous request 330 and response messages 331 of the device 100 that model the data exchanged in the single synchronous messaging 332.

Figure 6:
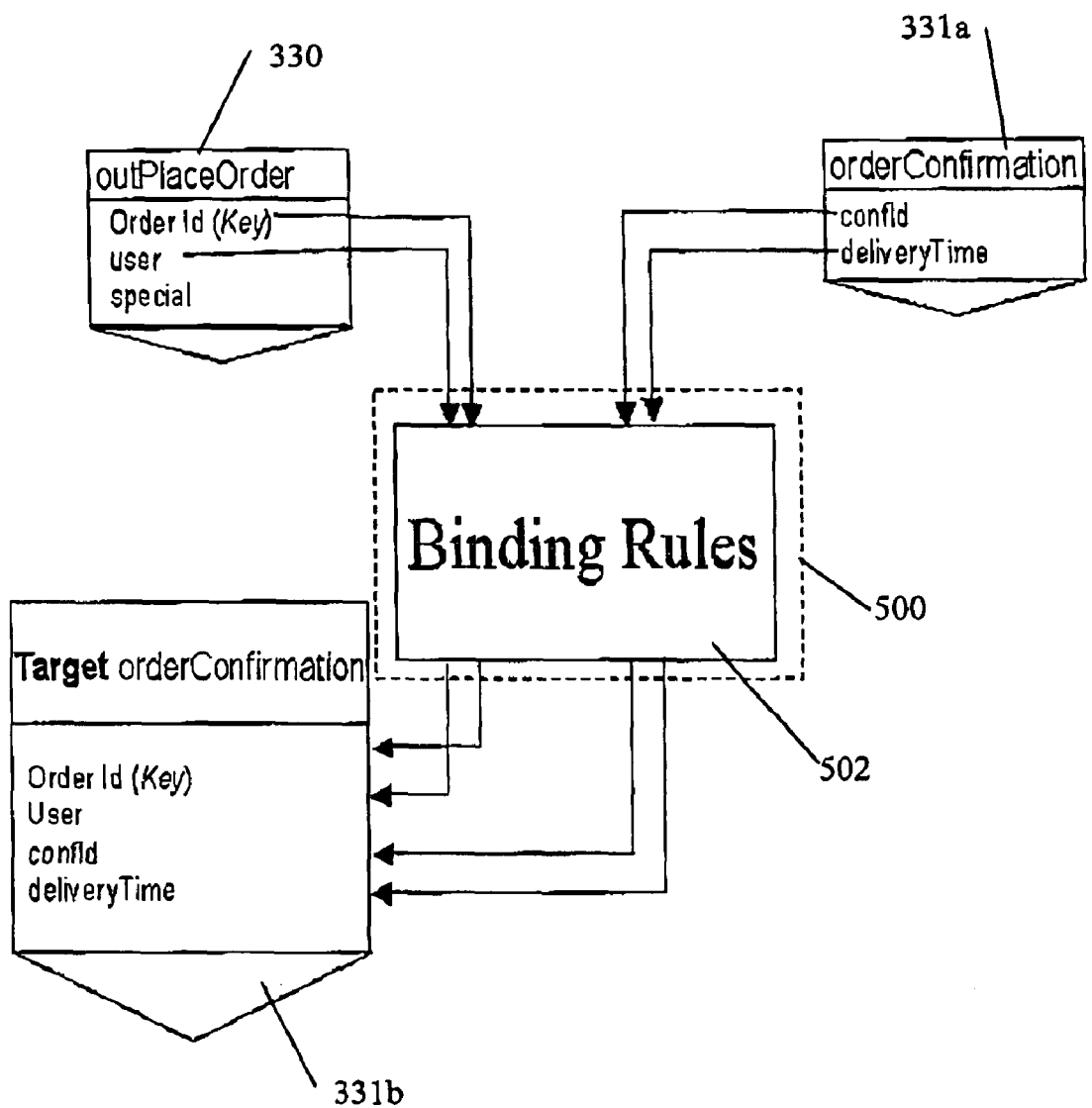
FIG. 6 shows binding rules of the mediator service of FIG. 5.

Referring to FIG. 6, Binding/linking Rules 502 are used by the mediator 500, which provide for the application of a series of transformations over the uncorrelated originating asynchronous message 330 and the synchronous response message 332 to produce the correlated asynchronous response message 331. The correlated message 331 contains sufficient information to be used by the originating device 100, of the asynchronous request message 330, for processing the request-response related logic at the application level of the application 302 executing on the device 100. Accordingly, the Mediator Service 500 is used to implement the Rules 502 over the uncorrelated message 330 so as to produce the resulting message 331 now linked to the originating message 330. The Rules 500 provide a logical binding/linking mechanism between the asynchronous request message 330 and the response message 331. It is recognized that the mediator service 500 could be hosted: on the device 100 as either part of the application 302 or as a separate service/program; on a third party server, and/or on the web service 106, as desired.

Being specified, the Rules 502 provide facility to combine the initial asynchronous request message 330 from the Originator device 100 and the synchronous response message 332 from the web Service 106, into the one logical unit represented as the response message 331. The Rules 502 can provide any level of flexibility to transform the initial request 330 and response 332 to the form of the Target Response message 331, which is used by the application 302 of the Originator device 100. The rules 502 can potentially include dynamic calculation and producing of message fields that were not originally presented in either the asynchronous request message 330 nor the synchronous response message 332. The Mediator Service 500 is responsible for: re-transmitting incoming asynchronous requests 330 to the synchronous Web Service 106 (with a potential format transformation if needed due to differing message 105 formats between the device 100 and the web service 106); receiving the appropriate synchronous response 332 from the web service 106; and applying the Rules 502 to produce the correlated asynchronous response 331 for delivery to the Originator device 100 of the asynchronous request message 330.

Figure 5:
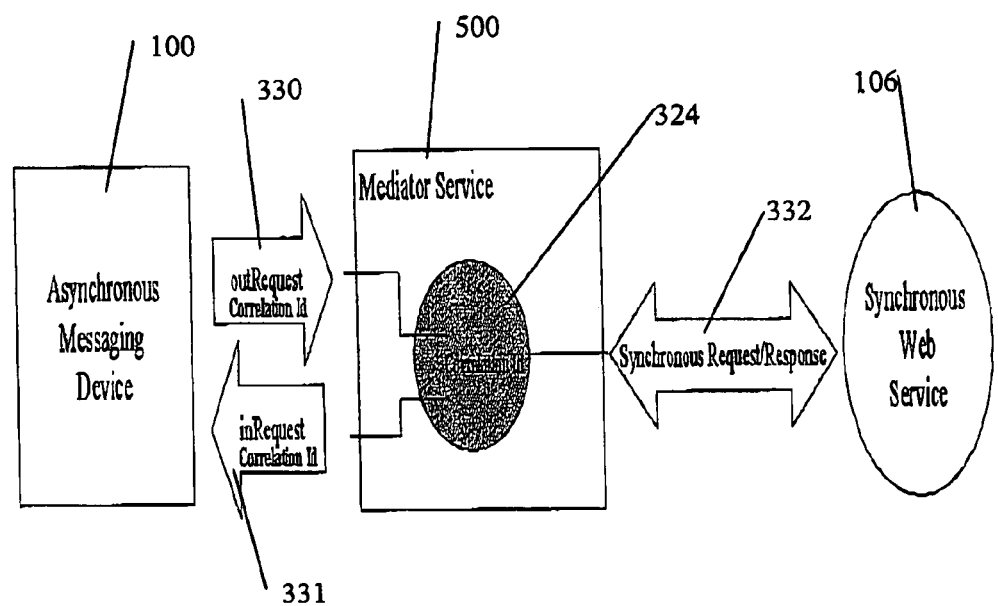
FIG. 5 shows a mediator service correlating asynchronous to synchronous messaging of the examples of FIGS. 3 and 4.
Figure 7:
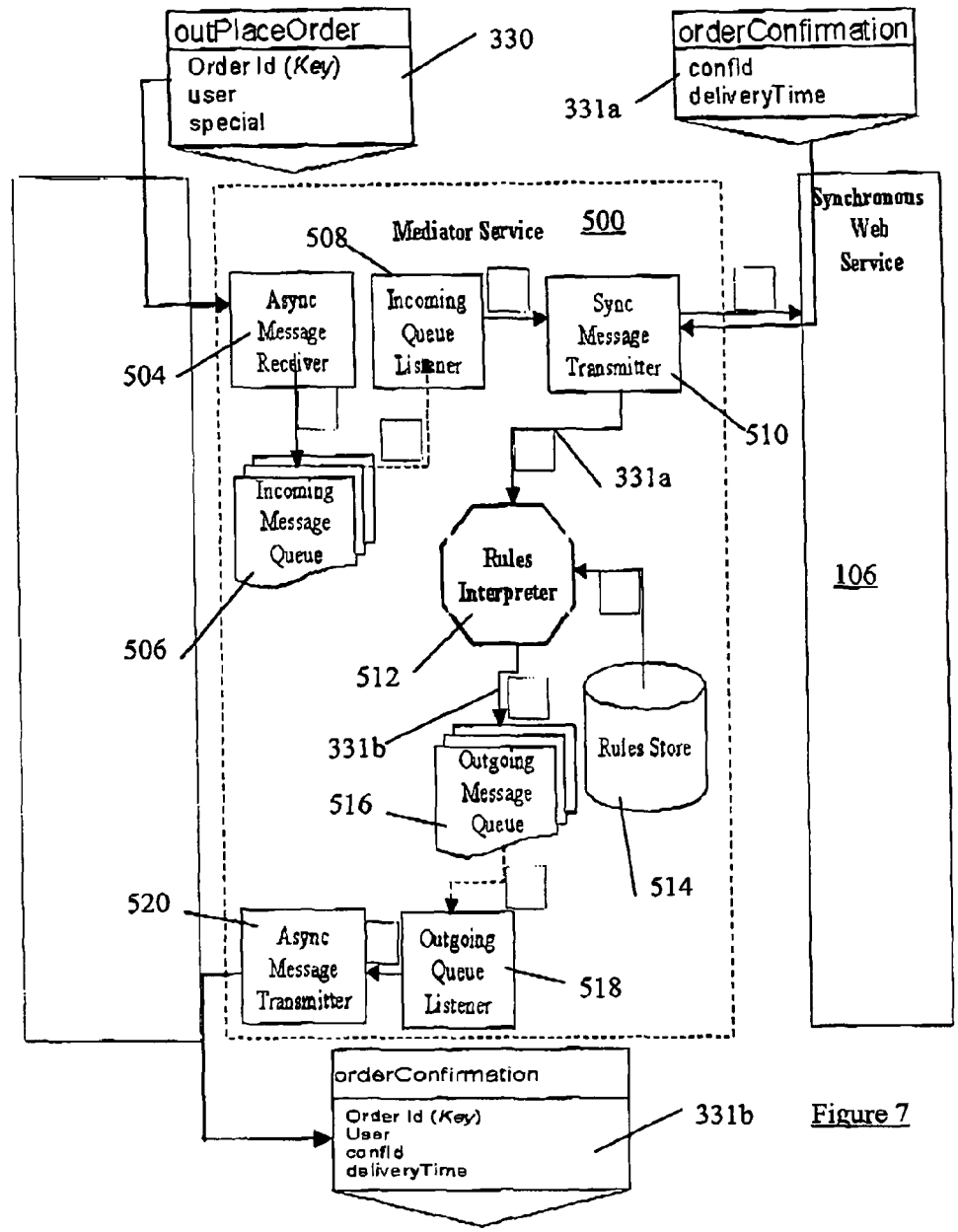
FIG. 7 is a block diagram of a mediator service of FIG. 5.

Referring to FIGS. 5 and 7, an example Mediator Service 500 is shown. The mediator service 500 has an Asynchronous Data Receiver 504 for receiving the message 330 from the originating device 100, e.g. the Asynchronous Message Receiver 504 receives the asynchronous message 330 from the Originator device 100. A message queue 506 is used for queuing the message 330 from the receiver 504, for example using a first in first out (FIFO) principle. The Asynchronous Message Receiver 504 stores the received message 330 into the Incoming Message Queue 506 and releases the Originator device 100, thus effectively decoupling the Originator device 100 from the Synchronous Web Service 106 and thereby helps to provide asynchronous communication as perceived by the device 100. An Incoming Queue Listener 508 is for retrieving any newly received messages 330 from the Incoming Message Queue 506. The Incoming Queue Listener 508 is registered with Incoming Message Queue 506 as a listener of the event indicating that there is the new message 330 available in the queue 506. Upon being notified, the listener 508 retrieves the next available message 330 from the queue 506.

The Incoming Queue Listener 508 dispatches the retrieved message 330 to a Synchronous Message Transmitter 510, which is used for delivering synchronous messages 332 to the Synchronous Web Service 106 and receives synchronous responses 332 in general, including the data of the synchronous response 331a—see FIG. 6) for sending to the device 10 in the asynchronous response 331b (see FIG. 6). The Synchronous Message Transmitter 510 can convert (if needed) the incoming message 330 into the form that can be consumed by the Web Service 106, while preserving the contents of the initial message 330, and calls the last message 330 synchronously with the web service 106. The transmitter 510 gets the synchronous response 332 from the Synchronous Web Service 106. Accordingly, the transmitter 510 delivers the asynchronous incoming message 330 received from the Incoming Queue Listener 508, and delivers the synchronous response 332 (containing message content 331a) received from the Synchronous Web Service 106 to a Rules Interpreter 512.

The Rules Interpreter 512 accesses the binding rules 502 from a rules store 514 and applies a transformation of the response 331a contents by the Binding Rules 502 to produce the response 331b. Therefore, the Rules Interpreter 512 retrieves the Binding Rules 502 associated with the specific type of the asynchronous incoming message 330 from the Rules Store 514, and the applies the rules 502 to the messages content 331a received in the synchronous response 332. The Rules Interpreter 512 stores the new message content 331b, created as an outcome of applying the Binding Rules 502, into the Outgoing Message Queue 516. An Outgoing Queue Listener 518 retrieves the response 331b ready to be sent to the Originator device 10 from the Outgoing Message Queue 516. The Outgoing Queue Listener 518 is registered with the Outgoing Message Queue 516 as a listener of the event indicating that there is the new message 331*b* available in the queue 516. Upon being notified, the listener 518 retrieves the next available message 331*b*. The Outgoing Queue Listener 518 dispatches the retrieved message 331*b* to an Asynchronous Message Transmitter 520. The asynchronous Message Transmitter 520 delivers the asynchronous messages 331*b* to the Originator device 100.

As described above, the defined binding rules 502, which when applied to the asynchronous request message 330 content and the synchronous response message 331*a* content, produce the new asynchronous response 331*b* content that can be meaningfully interpreted by the asynchronous message originator device 100. The mediator service 500 is used to proxy the synchronous interaction with the web service 106 and the mediator 500 then applies the rules 502 to produce new asynchronous messages 331*b*. As described above, the Binding Rules 502 are a means of transforming the message 330 and 331*a* contents in such a way as to allow logical binding of the entities in these messages 330,331*a* The Binding Rules 502 produce uniquely identifiable response asynchronous messages 331*a* that bear sufficient information to allow them to be interpreted and utilized by the asynchronous message originator device 100 in accordance with its internal logic (of the application program 302). The Binding Rules 502 can be used to hinder any message ambiguities and help to correlate otherwise unrelated asynchronous messages 330, 333 (see FIG. 8*a*), when the binding rules 502 are not applied as for the message 331*b* result of FIG. 8*b*. Therefore, the Binding Rules 502 can be thought of as a set of procedures allowing combination of information from the initial asynchronous request message 330 and the content 331*a* of the asynchronous response message 332 into the one logical unit called asynchronous target Response Message 331*b*.

Figure 8A:
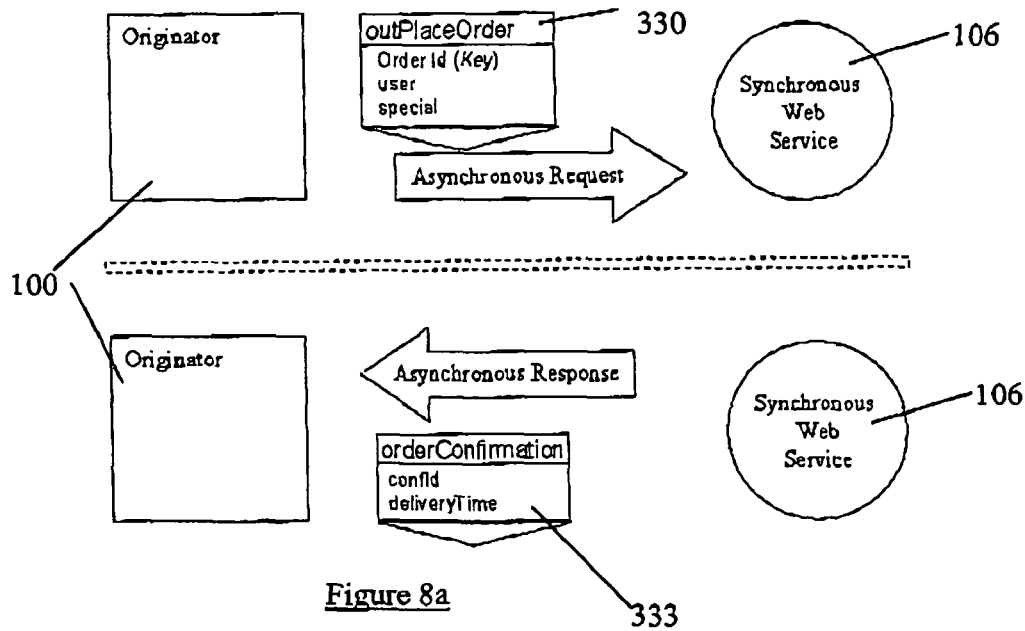
FIG. 8a is an example message communication without using the binding rules of FIG. 6.
Figure 8B:
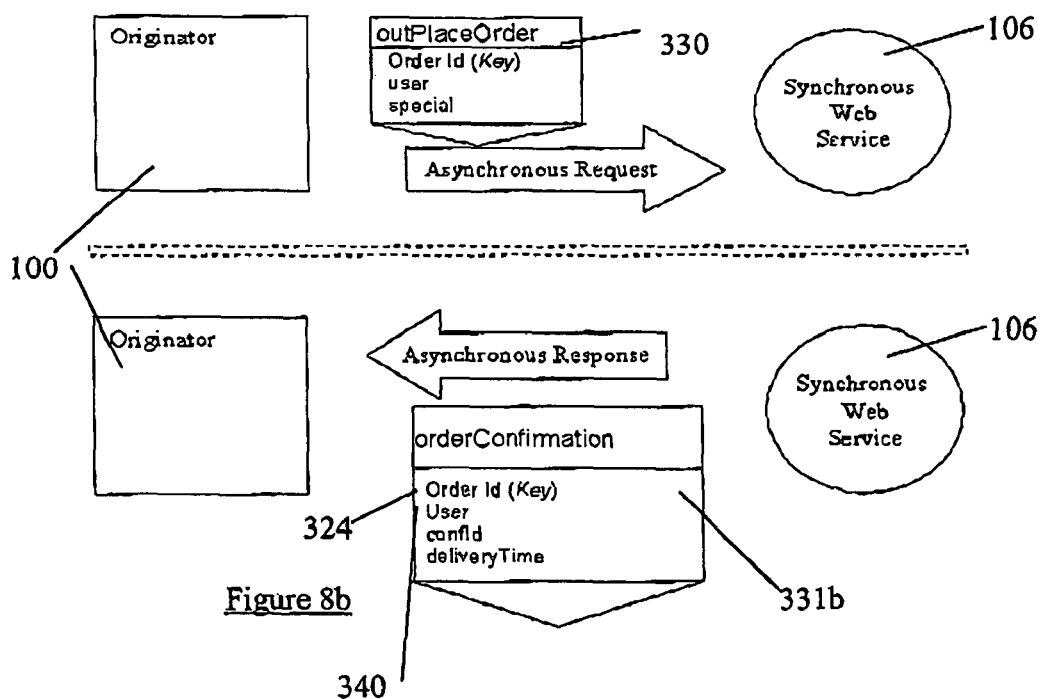
FIG. 8b is an example message communication using the binding rules of FIG. 6.

Referring to FIGS. 8*a* and 8*b*, let us consider the following example, where Originator device 100 and Web Service 106 communicate in an asynchronous fashion. In this case of FIG. 8*a*, the Originator device 100 has no possibility to correlate the response 330 and the request 333 content, since the response message 333 does not contain any information or fields that could be used to bind it to the original request message 330. In order to be able to uniquely identify the initial message 330 that triggered the asynchronous response message 333, some information identifying the initial request message 330 should be presented on the response message 333, as is shown in FIG. 8*b* with respect to message 331*b* in association with the application of the rules 502 by the mediator 500.

Referring to FIG. 8*b*, since response 331*b* contains Order Id field 324, which was part of the initial asynchronous message 330 as part of the identifier of the message 330, which was initially presented on the Request message 330 and sufficiently uniquely identifies this message 331*b*, the Originator device 100 is able to resolve the relation between initial request message 330 and received response messages 331*b* in an asynchronous fashion. In addition, the response message 331*b* can contain the User field 340, which also was presented on the request message 330, but the field 340 does not serve as its identifier 324. Still, it can be useful to have this field 340 on the response message 331*b* for performing some internal logic by the Originator device 100 after receiving the response 331*b*. Having this information 340 on the response message 331*b*, the Originator device 100 does not need to keep the original request message 330 during the time interval between sending the asynchronous request message 330 and receiving the asynchronous response 331*b*, since the device 100 expects to obtain all the necessary information for performing its internal logic related to the processing of the asynchronous request 330 and response 331*b*. It is recognized that the relay of the field 340 and 324. This scenario may be ideal from the Originator device 100 point of view, and therefore can be implemented by using the mediator to facilitate communication between the web service 106 and the device 100. Another implementation mode is to have the Synchronous Web Service support asynchronous operations for facilitating the use of the fields 324, 340 as needed.

It is recognized that the mediator service 500 can be a third party server as shown in FIG. 9, or can be part of the device 100 software/hardware and/or part of the web service 106 software/hardware as desired.

Binding Rules and Mediator Service Operation

Referring to FIGS. 7 and 9, this section describes the interactions between the Originator device 100 and the Web Service 106 to satisfy synchronous messaging 332 in the context of the Pizza Shop order process, by example. The following steps are followed, such as but not limited to:

901. The Originator 100 transmits asynchronous outPlaceOrder message to the Mediator Service 500. The outPlaceOrder contains the id 324, user 340 and special 341 fields;

902. The Mediator Service 500 initiates the synchronous request 332 to the Web Service 106 using the outPlaceOrder parameters;

903. The web service processes the information and immediately returns a result message orderConfirmation containing the confId 325 (response ID field form service 106) and deliveryTime (response data from service 106) fields;

904. The Mediator Service 500 obtains the result (orderConfirmation), e.g. 331*a*, and passes it along with the initial outPlaceOrder, e.g. 330, to the Binding Rules Processor 512;

905. The Binding Rules Processor 512 uses outPlaceOrder, orderConfirmation content and applies provided Binding Rules 502 to generate Target orderConfirmation message 331*b*. In this example, the Binding Rules 502 specify that the Target orderConfiramtion message 331*b* derives Order Id 324 and User 340 fields from the initial outPlaceOrder message 330 sent by Originator device 100, as well derives confId 325 and deliveryTime (service data) fields from the synchronous response orderConfirmation message 332 received from Web Service 106; and 906. Mediator Service 500 obtains the produced orderConfirmation message 331*b* from Binding Rules Processor 512 and sends it asynchronously to the Originator device 100.

Application Program 302

Figure 10:
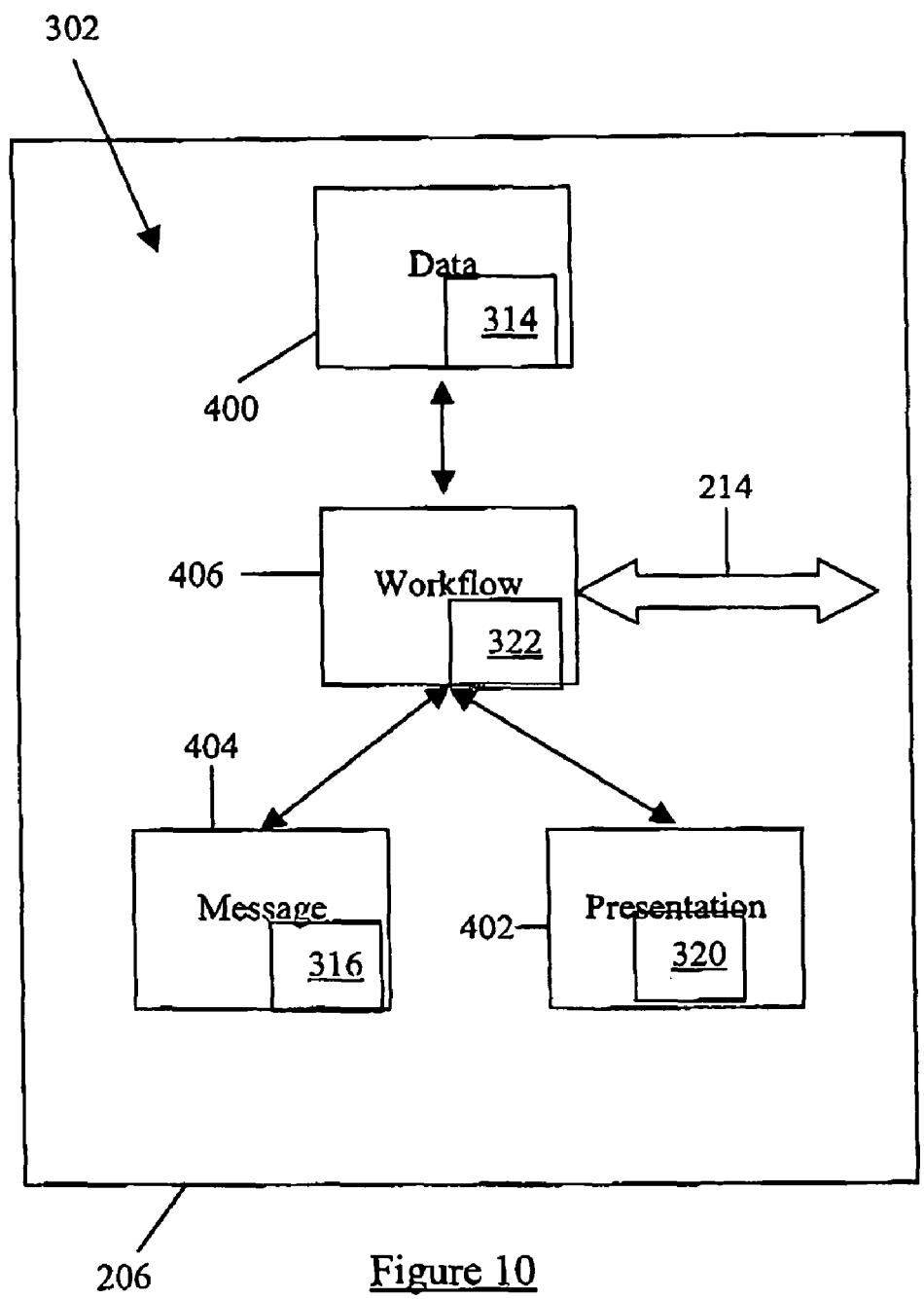
FIG. 10 is a block diagram of a component application program of FIG. 9.

Referring to FIG. 10, a block diagram of the component application program 302 comprises the data layer 400, the presentation layer 402 and the message layer 404, which are coordinated by workflow layer 406 through communications 214 with the client runtime environment 206. The structured definition language can be used to construct the definitions 314,316,320 of the layers 400, 402, 404 as a series of metadata records, which consist of a number of pre-defined elements representing specific attributes of a resource such that each element can have one or more values. Each metadata schema typically has defined characteristics such as but not limited to: a limited number of elements, a name of each element, and a meaning for each element. Example metadata schemas include such as but not limited to Dublin Core (DC), Anglo-American Cataloging Rules (AACR2), Government Information Locator Service (GILS), Encoded Archives Description (EAD), IMS Global Learning Consortium (IMS), and Australian Government Locator Service (AGLS). Encoding syntax allows the metadata of the layers 400, 402, 404 to be processed by the device infrastructure 204 (see FIG. 2), and encoding schemes include such as but not limited to XML, HTML, XHTML, XSML, RDF, Machine Readable Cataloging (MARC), and Multipurpose Internet Mail Extensions (MIME). The client runtime environment 206 can operate on the metadata descriptors of the layers 400, 402, 404 to provision an executable version of the application program 302. It is recognised that the layers 402 and 406 can be provided by other means for the application 302, such as but not limited to native code and other defined execution languages. The application 302 can make use of the data 400 and message 404 layers to implement mappings 318 (see FIG. 3) between fields of the definitions 314,316,320 to help correlate asynchronous messaging 105 between the device 100 and the web service 106.

Referring again to FIG. 10, the data layer 400 defines data entities (definitions 314) which are used by the application program 302. Examples of data entities which the data layer 400 may describe are orders, users, and financial transactions. The Data layer 400 defines what information is required to describe the data entities, and in what format the information is expressed. For example, the data layer 400 may define such as but not limited to an order which is comprised of a unique identifier for the order which is formatted as a number, a list of items which are formatted as strings, the time the order was created which has a date-time format, the status of the order which is formatted as a string, and a user who placed the order which is formatted according to the definitions 314 of the data layer 400.

Referring again to FIG. 10, the message layer 404 defines the format of messages 105 used by the application program 302 to communicate with external systems such as the web service 106. For example, one of the message definitions 316 may describe such as but not limited to a message for placing an order which includes the unique identifier for the order, the status of the order, and notes associated with the order.

It is noted that the use of layers 402 and 406 may be optional for the application 302.

Referring again to FIG. 10, the optional presentation layer 402 defines the appearance and behavior of the application program 302 as it is displayed by the user interface 202. The presentation layer 402 can specify GUI screens and controls, and actions to be executed when the user interacts with the application 302 using the user interface 202. For example, the presentation definitions 320 may define screens, labels, edit boxes, buttons and menus, and actions to be taken when the user types in an edit box or pushes a button. The majority of Web Service 106 consumers use a visual presentation of Web Service 106 operation results, and therefore provide the runtime environment 206 on their devices 100 capable of displaying user interface screens.

Referring to FIGS. 1 and 10, it is recognized that in the above described client application program 302 definitions hosting model, the presentation layer 402 may vary depending on the client platform and environment of the device 100. For example, in some cases Web Service consumers do not requite a visual presentation The application definitions 314, 316,320,322 of the application program 302 can be hosted in a Web Service registry as a bundle of platform-neutral data 400, message 404, workflow 406 layer descriptors with a set of platform-specific presentation layer 402 descriptors for various predefined client runtimes 206 (see FIG. 2). When the discovery or deployment request message 105 is issued the client type should be specified as a part of this request message 105. In order not to duplicate data, message, and workflow metadata while packaging application programs 302 for different client platforms of the communication devices 100, application definitions 314,316,320,322 can be hosted on the web service 106 (for example) as a bundle of platform-neutral component definitions 314,316,322 linked with different sets of presentation definitions 320. When a user makes a discovery or download request message 105, the client runtime type of the communication devices 100 is validated and the proper bundle is constructed for delivery by the web service 106 to the device 100 over the network 102, 104. For those Web Service 106 consumers, the client application programs 302 would contain the presentation layer 402 linked with the data 400 and message 404 layers through the workflow layer 406. It is recognized that the hosting model includes message 404 and data 400 layers with the remainder of the application functionality (presentation and workflow) expressed in a manner that cooperates with these defined layers 400, 404, such as but not limited to native code and other defined components as desired.

Referring again to FIG. 10, the optional workflow layer 406 of the application program 302 defines processing that occurs when an action is to be performed, such as an action specified by a presentation layer 402 as described above, or an action to be performed when messages 105 (see FIG. 1) arrive from the system 10. Presentation, workflow and message processing are defined by the workflow layer 406. The workflow layer 406 can be written as a series of instructions in a programming language or a scripting language, such as but not limited to ECMAScript, and can be compiled into native code and executed by the runtime environment 206, as described above. An example of the workflow layer 406 content may be to assign values to data, manipulate screens, or send the message 105. As with presentation layer 402, multiple workflow definitions 322 can be created to support capabilities and features that vary among devices 100. The appropriate workflow definition can be determined and sent at the time of downloading and provisioning of the application program 302.

ECMA (European Computer Manufacturers Association) Script is a standard script language, wherein scripts can be referred to as a sequence of instructions that is interpreted or carried out by another program rather than by the computer processor. Some other example of script languages are Perl, Rexx, VBScript, JavaScript, and Tcl/Tk. The scripting languages, in general, are instructional languages that are used to manipulate, customize, and automate the facilities of an existing system, such as the devices 100. In such systems, useful functionality is already available through the user interface 202 (see FIG. 2), and the scripting language is a mechanism for exposing that functionality to program control. In this way, the device 100 is said to provide a host runtime environment of objects and facilities which completes the capabilities of the scripting language.

Specifically, EMCAScript is an object-oriented programming language for performing computations and manipulating computational objects within the host runtime environment. ECMAScript can be used as a Web scripting language, providing a mechanism to perform service 106 computation as part of the Web-based client-server architecture of the system 10 (see FIG. 2). ECMAScript provides core scripting capabilities for a variety of host runtime environments, and therefore the core scripting language can be considered platform neutral for a number of particular host runtime environments. The runtime environment 206 (see FIG. 2) can provide the ECMAScript host runtime environment for client-side computation of the communication devices 100, such as but not limited to; objects that represent windows, menus, pop-ups, dialog boxes, text areas, anchors, frames, history, cookies, and input/output. Further, the host runtime environment of the runtime environment 206 provides a means to attach scripting code to events such as but not limited to change of focus, page and image loading, unloading, error, and abort, selection, form submission, and mouse actions. In implementations using ECMA scripting, the code appears within the workflow layer 406, combines user interface elements and fixed and computed text and images, and is reactive to user interaction on the user interface 202. The web service 106 (see FIG. 1) provides a different host environment for server-side computation including objects representing requests, clients, and files, and mechanisms to lock and share data. By using the client side and server side scripting together, it is possible to distribute computation between the client communication devices 100 and the service 106 while providing a customized user interface 202 for the Web-based application programs 302.

ECMAScript also defines a set of built-in operators which may not be, strictly speaking, functions or methods. ECMAScript operators include such as but not limited to various unary operations, multiplicative operators, additive operators, bitwise shift operators, relational operators, equality operators, binary bitwise operators, binary logical operators, assignment operators, and the comma operator. ECMAScript syntax resembles Java syntax, however, ECMAScript syntax is relaxed to enable it to serve as an easy-to-use scripting language for developers. For example, a variable in ECMAScript is not required to have its type declared nor are types associated with properties, and defined functions are not required to have their declarations appear textually before calls to them. It is recognized that in a class-based object-oriented programming language, in general, state is carried by instances, methods are carried by classes, and inheritance is only of structure and behavior. In ECMAScript, the state and methods are carried by objects, and structure, behavior, and state are all inherited.

Application Program 302 Example

Accordingly, referring to FIG. 10, the client application programs 302 can be defined as a set of platform-neutral component definitions 314,316, namely for data 400 and message 404 layers, and the optional presentation layer 402 using XML (or any other suitable structured definition language). The optional workflow layer 406 can be defined using ECMAScript (or any other suitable platform-neutral scripting language). The client runtime environment 206 (see FIG. 2) can generate component templates based on meta-definitions when the definitions 314,316,320,322 of the application program 302 are provisioned on the communication device 100. With a large variety of terminal runtime environments 206, the cross-platform standards such as XML or ECMAScript can be used to define application component metadata instead of pre-building the application programs 302. This delayed binding can allow the generic application definitions of the component application programs 302 to be run on a wide variety of terminal system environments 206, represented by various different communication devices 100.

The following example shows how a Web Services client application program 302 could be expressed using a structured definition language, such as but not limited to XML, and a platform neutral scripting/programming language, such as but not limited to ECMAScript, with defined components conforming with the following Document Type Definition (DTD):

```
<!ELEMENT wcApp (desc?, iconUrl?, res*, wcData*,
wcMsg*, style*, wcScr*, wcFlow)>
<!ATTLIST wcApp
        name CDATA #REQUIRED
        title CDATA #IMPLIED
        vendor CDATA #IMPLIED
        version CDATA #IMPLIED
        transportKey CDATA #IMPLIED
        installNotifURL CDATA #IMPLIED
        registerURL CDATA #IMPLIED
>
<!ELEMENT desc (#PCDATA)>
<!ELEMENT iconUrl (#PCDATA)>
<!ELEMENT res (#PCDATA)>
<!ATTLIST res
        name CDATA #REQUIRED
        url CDATA #REQUIRED
        type (xml | image | sound | any) #REQUIRED
        deferred (true | false) "false"
>
```

Example Data definitions 314
```
<!ELEMENT wcData (dfield+)>
<!ATTLIST wcData
        name CDATA #REQUIRED
        persisted (true | false) "true"
>
<!ELEMENT dfield (#PCDATA)>
<!ATTLIST dfield
        name CDATA #REQUIRED
        type (String | Number | Boolean | Date | Any) "Any"
        array (true | false) "false"
        cmp (true | false) "false"
        cmpName CDATA #IMPLIED
        key (0 | 1 | 2) "0"
>
```

Example Message definitions 316
```
<!ELEMENT wcMsg (mfield*)>
<!ATTLIST wcMsg
        name CDATA #REQUIRED
        mapping CDATA #IMPLIED
>
<!ATTLIST wcMsg
        pblock CDATA #IMPLIED
>
<!ELEMENT mfield (#PCDATA)>
<!ATTLIST mfield
        name CDATA #REQUIRED
        type (String | Number | Boolean | Date | Array | XML)
        #IMPLIED
        mapping CDATA #IMPLIED
>
```

Example Presentation definitions 320
```
<!ELEMENT wcScr (layout?, menu?, refresh?, event?)>
<!ATTLIST wcScr
        name CDATA #REQUIRED
        title CDATA #IMPLIED
        main (true | false) "false"
        dialog (true | false) "false"
        param CDATA #IMPLIED
>
<!ELEMENT style (font?)>
<!ATTLIST style
        name CDATA #REQUIRED
        bgColor CDATA #IMPLIED
>
<!ELEMENT font EMPTY>
<!ATTLIST font
        name CDATA #REQUIRED
        color CDATA #IMPLIED
        size CDATA #IMPLIED
        bold (true | false) "false"
        italic (true | false) "false"
        underline (true | false) "false"
>
<!ELEMENT refresh (msg+)>
<!ELEMENT msg (#PCDATA)>
<!ELEMENT layout (layout*, label*, separator*, edit*,
image*, choice*, button*, textarea*)>
```

-continued

```
<!ATTLIST layout
      type (grid | flow | border | vertical) #REQUIRED
      param CDATA #IMPLIED
      placement CDATA #IMPLIED
      style CDATA #IMPLIED
>
<!ELEMENT menu (item*)>
<!ELEMENT item (action, condition?)>
<!ATTLIST item
      name CDATA #REQUIRED
      label CDATA #REQUIRED
      shortcut CDATA #IMPLIED
>
<!ELEMENT action EMPTY>
<!ATTLIST action
      screen CDATA #IMPLIED
      pblock CDATA #IMPLIED
      param CDATA #IMPLIED
      acceptChanges (true | false) "true"
>
<!ELEMENT condition EMPTY>
<!ATTLIST condition
      pblock CDATA #REQUIRED
      param CDATA #IMPLIED
      result (true | false) "true"
>
<!ELEMENT event EMPTY>
<!ATTLIST event
      type (onInit | onClick | onChange | onFocusOut) "onInit"
      pblock CDATA #IMPLIED
      screen CDATA #IMPLIED
      param CDATA #IMPLIED
>
<!ELEMENT separator EMPTY>
<!ELEMENT label (condition?, event?)>
<!ATTLIST label
      name CDATA #REQUIRED
      value CDATA #REQUIRED
      placement CDATA #IMPLIED
      style CDATA #IMPLIED
>
<!ELEMENT edit (condition?, event?)>
<!ATTLIST edit
      name CDATA #REQUIRED
      value CDATA #IMPLIED
      mapping CDATA #IMPLIED
      type (char | number | date | pwd | phone | email) "char"
      readOnly (true | false) "false"
      placement CDATA #IMPLIED
      style CDATA #IMPLIED
>
<!ELEMENT textarea (condition?, event?)>
<!ATTLIST textarea
      name CDATA #REQUIRED
      value CDATA #IMPLIED
      mapping CDATA #IMPLIED
      readOnly (true | false) "false"
      placement CDATA #IMPLIED
      style CDATA #IMPLIED
>
<!ELEMENT image (condition?, event?)>
<!ATTLIST image
      name CDATA #REQUIRED
      resName CDATA #REQUIRED
      placement CDATA #IMPLIED
>
<!ELEMENT choice (condition?, event?, entry*)>
<!ATTLIST choice
      name CDATA #REQUIRED
      value CDATA #IMPLIED
      mapping CDATA #IMPLIED
      type (singleList | multiList | dropdown | checkbox | radio) "singleList"
      readOnly (true | false) "false"
      placement CDATA #IMPLIED
      style CDATA #IMPLIED
>
<!ELEMENT entry (#PCDATA)>
<!ELEMENT button (condition?, event?)>
<!ATTLIST button
      name CDATA #REQUIRED
      label CDATA #REQUIRED
      image (true | false) "false"
      placement CDATA #IMPLIED
      style CDATA #IMPLIED
>
Example Workflow definitions 322
<!ELEMENT wcFlow (pblock+)>
<!ELEMENT pblock (#PCDATA)>
<!ATTLIST pblock
      id CDATA #REQUIRED
      param CDATA #IMPLIED
>
```

As given above, the XML elements define the example component application 302 including a wcApp element, a wcData element, a wcMsg element, a wcSrc element, and a wcFlow element. Referring to FIG. 10, the wcApp element is a top-level element which defines the application program 302. The wcData element defines the example data layer 400, which is comprised of a group of named, typed fields. The wcMsg element defines the example message layer 404, which similarly defines a group of named, typed fields. The wcSrc element defines the example presentation layer 402. The example presentation layer 402 is a label, a separator, an image, a button, an edit field, a text area, a single-selection list, a multi-selection list, a drop-list, a checkbox, a radio button, or a screen containing a group of other presentation definitions 320.

Referring to the above example component application program 302 and FIG. 10, the wcFlow element defines the example workflow layer 406. The pblock attributes of the XML elements specify a pblock element nested in the wcFlow element. Each pblock element comprises script which defines part of the workflow of the application program 302. The script is written in ECMAScript. In order to define the behavior of the application 302, the optional workflow layer 406 uses ECMAScript to reference and manipulate the data layer 400, the presentation layer 402, and the message layer 404. The workflow layer 406 can also reference external object types, which allow actions to be performed on the components defined in the application 302. For example, a wcMsg type allows a message defined by a message definition 316 to be evaluated to determine whether mandatory fields have been supplied, and to be sent to an external system such as the web service 106. A wcData type allows the size of collections of data entities defined by data definition 314 to be determined, and allows data entities to be deleted. A wcScr type allows a presentation definition 320 to be displayed to the user. Similarly, a special dialog external object allows a message to be displayed to the user on the user interface 202 (see FIG. 2).

We claim:

1. A system for mediating communication between a mobile device and a data source over a network, the system comprising:
    an asynchronous message receiver configured to receive a one-time request in the form of an asynchronous request message from the device, the asynchronous request message including an identifier field for identifying the asynchronous request message and a message field, the device not storing the message field of the asynchronous request message after sending the asynchronous request message;
    a synchronous message transceiver communicatively coupled to the asynchronous message receiver and configured to synchronously communicate with the data source by sending a synchronous request message to the data source and receiving a synchronous response message from the data source in return, the synchronous request message including the message field of the asynchronous request message;

a rules processor communicatively coupled to the synchronous message transceiver and configured to apply a set of rules to combine the identifier field and the message field of the asynchronous request message with a message field of the synchronous response message to form an asynchronous response message that is correlated with the asynchronous request message, thereby allowing the device to use application logic resident thereon to resolve the relation between the asynchronous request and response messages by using the identifier field, and to process the asynchronous response message without having to store the message field of the asynchronous request message on the device after the asynchronous request message has been asynchronously pushed from the device;

a rules store communicatively coupled to the rules processor and configured to store the set of rules accessible by the rules processor;

an incoming listener, communicatively coupled with the synchronous message transceiver, and configured to detect when the asynchronous request message is received by the asynchronous message receiver and configured to dispatch the asynchronous request message to the synchronous message transceiver for transmission to the data source; and a queue, communicatively coupled to the incoming listener and to the asynchronous message receiver, configured to store the asynchronous request message originating from the device and to release the device following transmission of the asynchronous request message such that the device is decoupled from the data source, and to allow the incoming listener to retrieve the asynchronous request message stored in the queue.

2. The system of claim 1 further comprising an asynchronous message transmitter, communicatively coupled to the rules processor, for transmitting the asynchronous response message to the device over the network.

3. The system of claim 1, wherein the message field of the asynchronous request message is a user field for identifying a user of the device.

4. The system of claim 3, wherein the rules processor is configured to obtain the user field from the asynchronous request message.

5. The system of claim 2 further comprising an outgoing listener, communicatively coupled to the rules processor, configured to detect when the asynchronous response message is ready for transmission by the asynchronous message transmitter and to dispatch the asynchronous response message to the asynchronous message transmitter for transmission to the device.

6. The system of claim 1, wherein the system is hosted on a third party server acting as a proxy between the device and the data source.

7. The system of claim 6, wherein the data source is a web service and the device is a client of the web service.

8. A method for mediating communication between a mobile device and a data source over a network, the method comprising:

receiving a one-time request in the form of an asynchronous request message from the device over the network, the asynchronous request message including an identifier field for identifying the asynchronous request message and a message field, the device not storing the message field of the asynchronous request message after sending the asynchronous request message;

transmitting a synchronous request message to the data source and receiving a synchronous response message from the data source in return, the synchronous request message including the message field of the asynchronous request message; and applying a set of rules to combine the identifier field and the message field of the asynchronous request message with a message field of the synchronous response message to form an asynchronous response message that is correlated with the asynchronous request message, thereby allowing the device to use application logic resident thereon to resolve the relation between the asynchronous request and response messages by using the identifier field, and to process the asynchronous response message without having to store the message field of the asynchronous request message on the device after the asynchronous request message has been asynchronously pushed from the device;

storing the set of rules accessible by the rules processor in a rules store that is communicatively coupled to the rules processor;

detecting when the asynchronous request message is received by the asynchronous message receiver and dispatching the asynchronous request message to a synchronous message transceiver for transmission to the data source; and storing the asynchronous request message originating from the device and releasing the device following transmission of the asynchronous request message such that the device is decoupled from the data source prior to dispatching the asynchronous request message to the synchronous message transceiver.

9. The method of claim 8 further comprising transmitting the asynchronous response message to the device over the network.

10. The method of claim 8, wherein the message field of the asynchronous request message is a user field for identifying a user of the device.

11. The method of claim 10 further comprising obtaining the user field from the asynchronous request message.

12. The method of claim 9 further comprising detecting when the asynchronous response message is ready for transmission and dispatching the asynchronous response message to an asynchronous message transmitter for transmission to the device.

13. The method of claim 8, wherein the system is hosted on a third party server acting as a proxy between the device and the data source.

14. The method of claim 13, wherein the data source is a web service and the device is a client of the web service.

15. A non-transitory computer readable medium storing a computer program for mediating communication between a mobile device and a data source over a network, the computer readable medium comprising:

an asynchronous message receiver module stored on the medium and configured to enable an asynchronous message receiver to receive a one-time request in the form of an asynchronous request message from the device, the asynchronous request message including an identifier field for identifying the asynchronous request message and a message field, the device not storing the message field of the asynchronous request message after sending the asynchronous request message;

a synchronous message transceiver module stored on the medium, configured to enable a synchronous message transceiver to communicate with the asynchronous message receiver and configured to enable the synchronous message transceiver to synchronously communicate with the data source by sending a synchronous request message to the data source and receiving a synchronous response message from the data source in return, the synchronous request message including the message field of the asynchronous request message; and a rules processor module stored on the medium, configured to enable a rules processor to communicate with the synchronous message transceiver module and to apply a set of rules to combine the identifier field and the message field of the asynchronous request message with a message field of the synchronous response message to form an asynchronous response message that is correlated with the asynchronous request message, thereby allowing the device to use application logic resident thereon to resolve the relation between the asynchronous request and response messages by using the identifier field, and to process the asynchronous response message without having to store the message field of the asynchronous request message on the device after the asynchronous request message has been asynchronously pushed from the device;

a rules store module stored on the medium, configured to enable a rules store to communicate with the rules processor and to store the set of rules accessible by the rules processor;

an incoming listener module stored on the medium, configured to enable an incoming listener to communicate with the synchronous message transceiver module, to detect when the asynchronous request message is received by the asynchronous message receiver and configured to dispatch the asynchronous request message to the synchronous message transceiver for transmission to the data source; and a queue module stored on the medium, configured to enable a queue to communicate with the incoming listener and the asynchronous message receiver, to store the asynchronous request message originating from the device, to release the device following transmission of the asynchronous request message such that the device is decoupled from the data source, and to allow the incoming listener to retrieve the asynchronous request message stored in the queue.

\* \* \* \* \*